United States Patent [19]

Weissmuller

[11] 4,032,082
[45] June 28, 1977

[54] COMBINED TRANSMIT AND RECEIVE PNEUMATIC CARRIER TERMINAL WITH MECHANICAL CARRIER CATCH

[76] Inventor: Adam Weissmuller, 27 Dale Ave., Pompton Plains, N.J. 07444

[22] Filed: Nov. 3, 1975

[21] Appl. No.: 628,111

[52] U.S. Cl. .............................................. 243/19
[51] Int. Cl.² .................................... B65G 51/32
[58] Field of Search ............... 243/1, 7, 8, 9, 19, 243/20, 23, 24, 25, 28, 38

[56] References Cited

UNITED STATES PATENTS

| | | | |
|---|---|---|---|
| 3,080,136 | 3/1963 | Kelley et al. | 243/19 X |
| 3,189,297 | 6/1965 | Ellithorpe | 243/19 |
| 3,237,881 | 3/1966 | Grosswiller et al. | 243/19 |
| 3,659,809 | 5/1972 | Cook | 243/19 |

*Primary Examiner*—Evon C. Blunk
*Assistant Examiner*—James L. Rowland

[57] ABSTRACT

A terminal for transmitting and receiving pneumatic carriers is disclosed having a pneumatic tube section which constitutes an upwardly directed extension of a combined transmit/receive line of a pneumatic tube system. The tube extension section is provided with a carrier insertion/removal opening which is normally closed by a vertically reciprocating door driven from a bidirectional drive mechanism. Also included is a catch pivotally mounted for movement between (a) an inner position projecting into the pneumatic tube extension section for supporting the base of a received carrier and (b) an outer position for permitting unobstructed passage of a carrier between the combined transmit/receive system line and the pneumatic tube extension section which constitutes an extension thereof. A counterweight is connected to the catch through a lost motion mechanism. The counterweight is also connected to the door drive mechanism via a link, e.g., a flexible cable. The link maintains the counterweight in an upper position when the door is closed biasing the catch to its inner position to support a received carrier thereon. The catch, however, is free to momentarily pivot to its outer position when an upwardly moving carrier momentarily passes by in the course of receipt at the terminal. The link between the counterweight and the door actuating mechanism biases the catch to its outer position, allowing unobstructed insertion of the carrier into the tube extension for transmission, when the door is in its open position, except when a received carrier supported by the detent has not yet been manually withdrawn through the open terminal door in which case the weight of the carrier maintains the detent in its inner position.

13 Claims, 11 Drawing Figures

Fig. 1 Fig. 2 Fig. 3 Fig. 4
Fig. 1b Fig. 2b Fig. 3b
Fig. 1c Fig. 2c Fig. 3c

COMBINED TRANSMIT AND RECEIVE PNEUMATIC CARRIER TERMINAL WITH MECHANICAL CARRIER CATCH

This invention relates to terminals for receiving and transmitting pneumatic carriers via a combined transmit/send line, and more particularly to a catch mechanism for use with such terminals which supports received carriers in a position affording convenient manual removal through an opening in the terminal housing, yet retracts to permit unobstructed carrier transmission.

Combined transmit and receive terminals for single tube pneumatic tube systems, i.e., pneumatic systems in which the same tube is used for both transmission and receipt of carriers, typically include some form of catch mechanism for holding a carrier which has been received at the terminal in a predetermined position for convenient removal by operating personnel. In the past, catch mechanisms have often required electromechanical detent arrangements acting on the received carrier which use solenoids or some other form of electromagnetic actuator to actuate and/or deactuate the detent. Electromagnetically actuated carrier catches, in addition to the cost of the electromagnetic actuator, such as a solenoid or the like, also require appropriate electrical switches, power supplies and the like for energizing and de-energizing the electromagnetic actuator at the appropriate time, such as upon carrier receipt, carrier removal, carrier transmission and the like.

Accordingly, it has been an objective of this invention to provide a carrier catch mechanism for a combined transmit and receive terminal which entirely eleminates the need for electromagnetic actuators, electrical switches and the like to accomplish the carrier catching function. This objective has been accomplished in accordance with certain principles of this invention by providing, in a combined transmit and receive tube system, a generally upwardly directed pneumatic tube section which forms an extension of the system pneumatic line, the extension section having a carrier insertion and withdrawal opening normally closed by a movable door. Associated with the door is a door-actuating mechanism which, under the command of suitable switches responsive to the arrival and departure of the carrier, operates to open and close the door.

Also included in the terminal of this invention is a catch assembly having a pivotal catch element movably mounted for pivotal movement between (a) an inner position projecting into the pneumatic tube extension and (b) an outer position clear of the tube extension. In the inner position the pivotal catch element can underly a received carrier, supporting it for convenient manual removal via the opening in the tube extension section when the door is placed in its opening position by the door actuating mechanism. In its outer position, in which the catch element is clear of the tube extension, a carrier can pass freely between the system line and the terminal extension tube section without obstruction as is desirable when carriers are received and transmitted.

To control the position of the pivotal catch element such that it will underly the bottom end of a received carrier until the latter is removed, and yet move to its outer position clear of the tube when a carrier is moving between the system line and the terminal tube extension as occurs upon either carrier receipt or transmission, a counterweight is provided which is connected to the pivotal catch element via a lost motion mechanism and to the door actuating mechanism via a link. The link, when the terminal door is closed awaiting receipt of a carrier, biases the catch element to its inner position projecting into the terminal tube section, and does so without aid of an electromagnetic actuator or the like. However, the catch element is free to pivot momentarily to its outer position clear of the tube extension when a moving carrier momentarily passes thereby in the course of carrier receipt, the catch element returning to its inner position projecting into the tubular extension to underly the received carrier once the carrier has moved upwardly past the catch element. Again, the momentary movement of the catch element occurring when a carrier is received is accomplished without use of electromechanical actuators.

The link, when the door is opened by the door actuating mechanism, permits the counterweight to pivot the catch element to its outer position clear of the terminal tube extension when a received carrier supported by the inwardly projecting catch element is removed through the open door. With the catch element pivoted to its inner position clear of the terminal tube extension by the counterweight, a carrier can be inserted into the tubular extension via the open door and move unobstructed into the system tube. Thus, when the door is open, a received carrier will be supported by the inwardly positioned catch element, but once the carrier is removed via the open door the catch element automatically shifts to its inner position clear of the tube extension, allowing unobstructed insertion of a carrier for transmission without aid of an electromagnetic actuator, electrical switches or the like.

This invention, by reason of the elimination of an electromagnetic actuator in the catch mechanism, is less expensive than many prior art schemes which require such actuators. In addition, and by virtue of placement of the lost motion connection between the catch element and the counterweight, the catch is free to momentarily retract without moving the counterweight upon momentary passage of a carrier therepast as an incident to carrier receipt. This reduces wear and noise, and avoids unnecessary carrier deceleration which might otherwise occur were it necessary for a received carrier to move the counterweight as an incident to receipt at the terminal.

These and other advantages and objectives of the invention will become more readily apparent from a detailed description thereof taken in connection with the drawings in which:

FIG. 1 is a side elevational view, partly in cross-section, of the send and receive terminal of this invention with the door closed showing a received carrier supported by the catch;

FIG. 1a is a side elevational view, partly in cross-section, of the catch and counterweight arm when a received carrier is supported by the catch and the terminal door is closed;

FIG. 1b is a side elevational view, partly in cross-section, of the catch and counterweight arm when a carrier is passing the catch during receipt at the terminal with the door closed;

FIG. 2 is a side elevational view, partly in cross-section, of the terminal showing a received carrier supported by the catch with the terminal door open;

FIG. 2a is a side elevational view, partly in cross-section, of the catch and counterweight arm with the carrier supported by the catch and the terminal door open;

FIG. 3 is a side elevational view, partly in cross-section, of the terminal with the door open and a carrier being inserted for transmission;

FIG. 3a is a side elevational view, partly in cross-section, of the catch and counterweight arm when the carrier door is open and a carrier is being inserted for transmission;

FIG. 4 is a side elevational view, partly in cross-section, of the terminal showing the door closed and a carrier being transmitted;

FIG. 5 is a plan view of a portion of the terminal showing the carrier catch, counterweight arm, and mounting assembly therefor in the position occupied when a received carrier is supported by the catch and the terminal door is in the open position corresponding to FIGS. 2 and 2a;

Figures 1, 1B, 1C, 2, 2B, 2C, 3, 3B, 3C, 4:
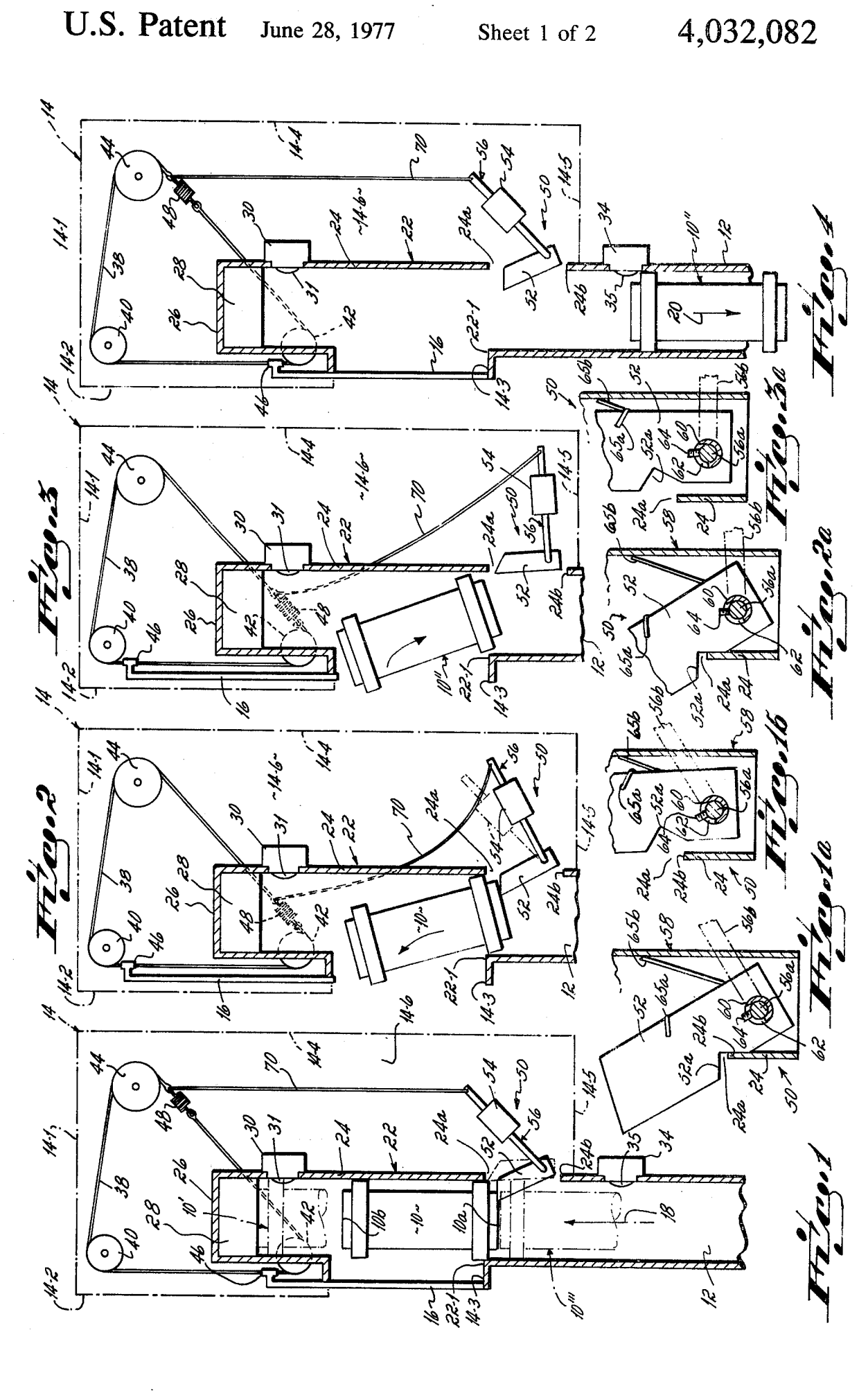
Figure 5:
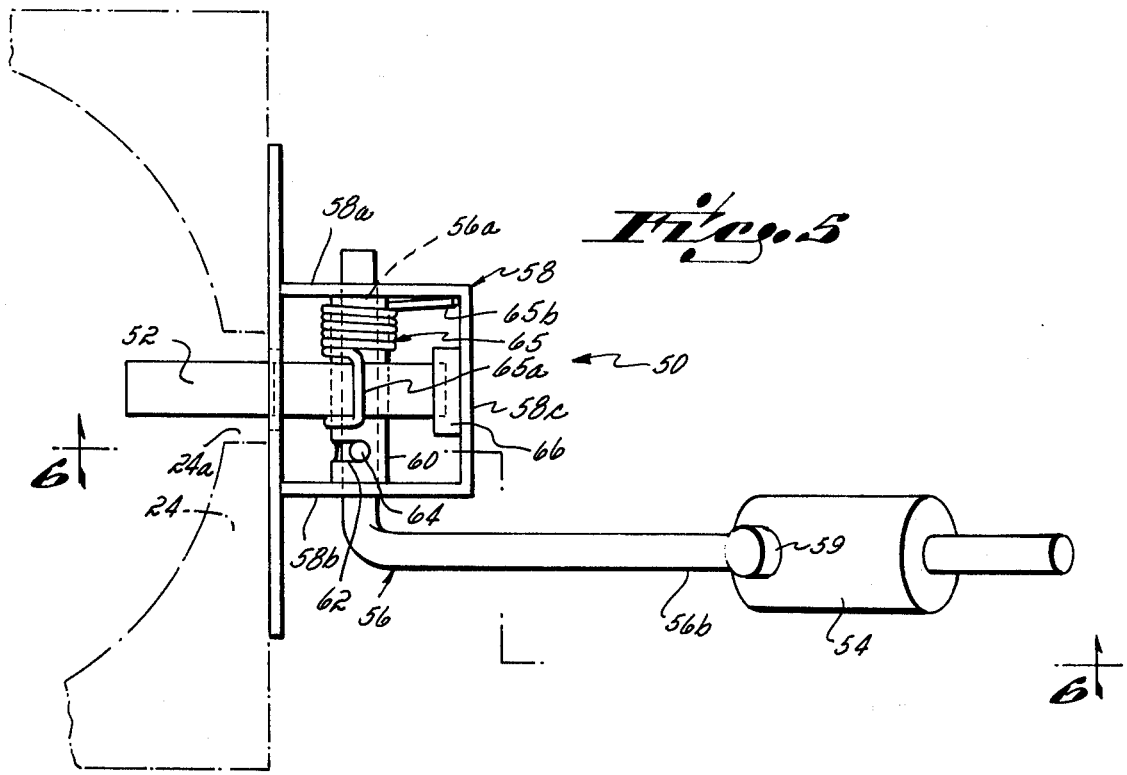

The terminal of this invention as shown in the Figures is adapted to receive carriers 10 which are moving in an upwardly direction in a pneumatic tube 12, support the received carrier for convenient manual removal by operating personnel, and transmit a carrier 10" which is inserted into the terminal for transmission in a downwardly direction through the pneumatic tube 12. The terminal includes a housing 14 which may have any convenient shape and which has a top wall or ceiling 14-1, a front wall 14-2 with an opening 14-3 therein, a rear wall 14-4, and a bottom wall 14-5 having an opening therein through which the upper end of the pneumatic tube 12 passes into the interior 14-6 of the terminal. A vertically reciprocating door 16 is provided. Door 16 is movable between a lower position shown in FIG. 1, closing terminal housing opening 14-3, and an upper position shown in FIG. 2 in which the terminal interior 14-6 is accessible through the opening 14-3. Side walls (not shown) complete the terminal housing 14 to render the housing interior 14-6 substantially airtight when the door 16 is in its lowermost, closed position.

Also included is a suitable blower (not shown) communicating with the pneumatic tube 12. The blower is operative to pressurize the tube 12 at superatmosphere pressure when a carrier is being transmitted to the terminal 14 such that it is propelled in the direction of arrow 18 (FIG. 1) as a consequence of a pneumatic pressure being exerted on its lowermost end 10a. The blower operates when a carrier is transmitted or sent from the terminal, to create subatmospheric pressure, or a vacuum, in the tube 12 below the leading end of the transmitted carrier such that it will move in the direction of arrow 20 (FIG. 4).

Located within the interior 14-6 of the terminal housing 14 and extending upwardly from the send-receive pneumatic tube 12 is a terminal assembly 22, which includes a pneumatic tube section 24. Tube section 24 at its lower end is open and communicates with the upper end of the send/receive tube 12, and at its upper end is closed by a cover 26. Located at the upper end of the terminal tube section 24 is a cushion 28 of rubber or other suitable shock absorbing material which is secured in place against the cover 26 by suitable means (not shown). The cushion 28 functions to dissipate the energy of a moving carrier 10' received in terminal tube section 24 when its upper leading edge strikes the cushion.

The terminal tube section 24 is provided with an opening 22-1 which is coextensive with the opening 14-3 of the housing front wall 14-2. The opening 22-1 in terminal tube section 24 and opening 14-3 in the housing front wall 14-2 are dimensioned to permit convenient insertion and removal of carriers which are being transmitted and received, respectively.

Also included in the terminal assembly 22 is an arrival switch 30 which has a movable actuating element 31 normally projecting into the path of a received carrier, such as carrier 10' shown in FIG. 1. The arrival switch, upon engagement with the leading end of an arriving carrier 10' in the region of the cushion 28, strikes the switch actuator 31 triggering switch 30 which via suitable means (not shown) turns off the blower which propelled the carrier through the tube 12 in the direction of arrow 18 into the terminal tube section 24. Also included in the carrier assembly 22 is a send switch 34 having a movable actuator 35 which normally projects into the pneumatic tube section 24. Send switch 34 is operative upon transmission of a carrier 10" from the terminal housing 14 to energize the blower and provide subatmospheric pressure forward of the leading end of the carrier 10", causing it to move in the direction of arrow 20. Specifically, the carrier 10" which has been inserted into the tube section 24 via the opening 14-3 falls down the tube under the force of gravity in the course of which the movable switch element 35 is triggered, energizing the blower which effectively pulls the inserted carrier 10" in the direction of arrow 20 down the tube 12, as shown in FIG. 4.

Thus, arrival switch 30 and its associated movable actuator 31 in the receive mode are operative upon arrival of a carrier 10 in the terminal tube section 24 to terminate operation of the blower which had applied superatmospheric pressure to the trailing end of the carrier to push it in the direction of arrow 18 through the tube 12. Send switch 34 and its associated actuator 35 are operative in the transmission mode to actuate the blower when a carrier 10" is dropped into the tube section 24 via opening 14-3 for transmission, thereby creating subatmospheric pressure forward of the leading end of the carrier as it moves in the direction of arrow 20, effectively pulling it through the tube 12.

The vertically reciprocating door 16 which covers the openings 14-3 and 22-1 in the terminal housing wall 14-2 and terminal tube section 22, respectively, is raised and lowered via a cable 38 which trains over pulleys 40, 42 and 44 mounted for bidirectional rotational movement about parallel horizontal axes. The cable 38 is secured to the door 16 by a clamp 46 formed integral with the upper edge of the door 16. The cable 38 is bidirectionally driven by a bidirectional motor (not shown) having a shaft which is keyed to the pulley 44. When the arrival switch 30 is actuated upon arrival of the leading end 10b of a carrier 10 proximate the cushion 28, in addition to the blower being turned off, the cable-driving motor is actuated, rotating the pulleys clockwise to raise the door 16 from the position shown in FIG. 1 to the position shown in FIG. 2. De-energization of the cable-driving motor is effected by suitable limit switches (not shown) which sense when the door 16 is in its fully raised or open position. The cable-driving motor is energized to rotate the pulleys in a counterclockwise direction to move the door from the upper open position shown in FIG. 3 to the lower closed position shown in FIG. 4 when the send switch 34 is actuated in response to dropping a carrier 10" into the tube 12. Suitable limit switches cooperating with the door 16 sense when the door has moved to its fully closed position and in response thereto terminate energization of the motor.

A tension coil spring 48 has its opposite ends connected to opposite ends of the door operating cable 38 and functions as a shock absorber when the door raising motor is started and stopped.

The terminal assembly 22 also includes a carrier catch assembly 50 consisting of an elongated pivotal catch 52, a counterweight 54 and an L-shaped counterweight rod 56. The shorter end 56a of the rod 56 is journaled for pivotal rotation about a horizontal axis in a U-shaped bracket 58 secured to the lower end of the terminal tube section 24. The counterweight 54 is slidably received on the long end 56b of the rod 56 and adjustably secured at a desired point by a set screw 59. A short tube 60 slidably surrounds that portion of the rod end 56a located between the side wall 58a and 58b of bracket 58. The tube 60 is rigidly secured to the catch 52 at the lower end thereof such that pivotal movement of the catch 52 and tube 60 occur in unison. The tube 60 is provided with an arcuate slot 62 which receives a set screw 64 threaded into rod section 56a. The slot 62 extends for approximately 150° and limits pivotal movement of the catch 52 relative to the rod 56 to an angle of approximately 120°. Stated differently, the catch 52 by reason of it being formed integral with the tube 60 which has a slot 62 receiving a screw 64 anchored in rod 56, has approximately 120° of lost motion with respect to the rod 56 and vice versa.

The terminal tube section 24 is provided with an opening 24a through which the catch 52 pivotally moves between an inner position shown in FIGS. 1 and 2 supporting a carrier, and an outer position shown in phantom in FIG. 1 and in solid FIG. 3 to permit a received carrier to pass by the catch for support thereby (FIG. 1) and to facilitate unobstructed movement of an inserted carrier 10' past the catch as shown in FIG. 3. Inward movement of the catch 52 is limited by engagement of a notch shoulder 52a formed in the catch with the lip 24b or opening 24a. Clockwise pivotal movement of the catch 52 is limited by engagement of the upper end of the catch 52 with a shock absorbing pad 66 secured to the central wall 58c of the bracket 58. A coil spring 65 surrounding the tube 60 and having its opposite ends 65a and 65b engaging the catch 52 and bracket 58 biases the catch to its inner position shown in FIG. 6.

Figure 6:
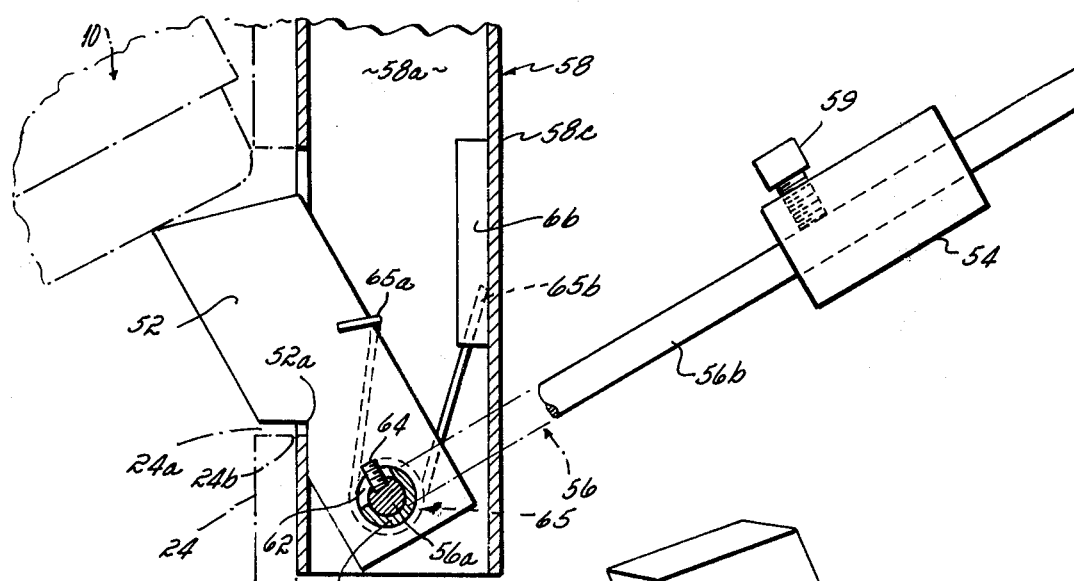
FIG. 6 is a cross-section view taken along line 6—6 of FIG. 5.
Figure 7:
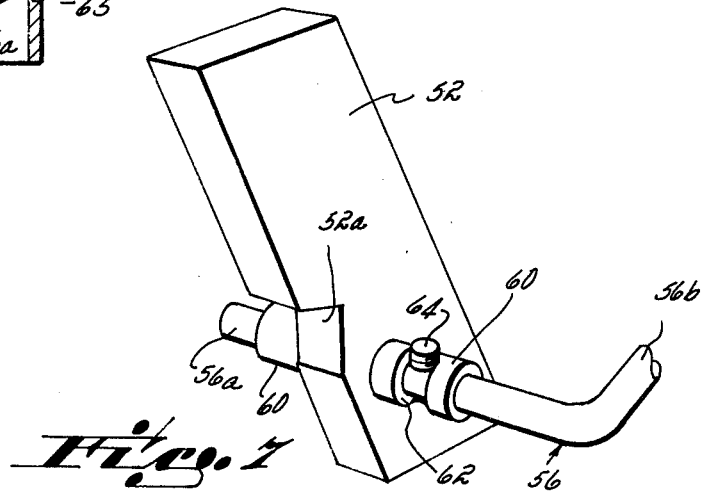
FIG. 7 is a perspective view of the catch and counterweight arm in the position occupied in FIGS. 2, 2a, 5 and 6.

As noted, with the catch 52 in the inner position shown in FIG. 6 projecting through the opening 24a, a carrier 10 can be supported in the terminal tube section 24 for convenient removal via openings 14-3 and 22-1. With the catch 52 in the outer position shown in phantom in FIG. 1, the received carrier is free to pass above the catch in the direction of arrow 18 for support thereby, and/or be inserted into the tube 12 unobstructed by the catch.

A cable 70 is connected between the free outer end of the rod 56 and the cable 38 at a point proximate spring 48. When the door 16 is in its lower closed position shown in FIG. 1 the cable 70 elevates the counterweight arm 56 to the position shown in FIGS. 1 and 4. Notwithstanding elevated positioning of arm 56 by cable 70 as shown in FIGS. 1 and 4, the catch 52, by reason of the lost motion afforded by the interaction of slot 62 and screw 64, is free to move between its inner position supporting a carrier shown in FIG. 1 and its outer position for unobstructed transmission of a carrier as shown in FIG. 3.

In operation, and assuming the apparatus is in the position shown in FIG. 1 with the door 16 closed, the cable 70 pulled taut, and the catch 52 projecting into the terminal tube section 24, when a carrier moving upwardly in the direction of arrow 18 is received, the upper leading edge of the carrier 10''' strikes the catch 52. Catch 52, while normally biased inwardly by the spring 65, is cammed outwardly and moves out of the path of the oncoming carrier by reason of the slot 62 which permits limited lost motion between the catch 52 and the rod 56 which is pulled upwardly by taut cable 70.

When the received carrier has passed the catch 52 such that its lower end is above the upper end of the catch, the catch pivots inwardly under the action of spring 65, preventing the carrier from falling back into the tube 12. Continued upward motion of a received carrier results in the leading upper end of the carrier 10' striking the cushion 28 in the course of which arrival switch 30 is triggered to deenergize the blower motor which removes superatmospheric pressure in the tube 12 and energizes the door operating cable motor to raise the door 16. While the door is rising the received carrier which has had its forward motion arrested by striking the cushion 28, drops downwardly until its lower end seats on the inwardly projecting catch as shown in FIG. 2. With the door 16 open and the carrier 10 supported by catch 52, the carrier can be conveniently manually removed via the opening 14-3 in the terminal housing 14.

When the terminal door 16 is opened upon actuation of the arrival switch 30, the cable 70 connected to the counterweight rod 56 is slackened. Slackening of the cable 70 is ineffective to cause the catch 52 to pivot clockwise under the force of the counterweighted arm 56 so long as the carrier is supported atop the catch 52 such as shown in FIG. 2. However, once the carrier is removed from atop the catch 52, the slackened condition of cable 70 permits the counterclockwise arm 56 to pivot the catch 52 clockwise out of the terminal tube section 24. With the catch 52 so pivoted a carrier, such as carrier 10", can be inserted into the terminal tube section 24 for transmission through the tube 12, as shown in FIGS. 3 and 4. Assuming a carrier 10" is so inserted, when the carrier falls down tube section 24 to a point sufficient to actuate send switch 34, the blower is energized to create subatmospheric pressure in the tube 12, drawing the inserted carrier downwardly in the direction of arrow 20.

In addition, actuation of the send switch 34 energizes the door cable operating motor causing the door to move from its upper position shown in FIG. 3 to its lower position shown in FIG. 4, closing the terminal opening 14-3. Movement of the cable in the manner indicated to lower the door 16 is also effective to once again tighten the cable 70. With the cable 70 taut, the counterweighted arm 56 is pivoted counterclockwise causing the catch 52 to once again move into the terminal tube section 24 through the opening 24a, readying the system to receive the next carrier.

Of course, after transmitting a carrier it is also possible to transmit a second carrier without having received a carrier in the interim. As noted, and assuming a carrier has been sent, the components of the terminal assume the position shown in FIG. 4. If the door 16 is now opened without first having received a carrier, the cable 70 will be slackened and the counterweighted rod 56 will pivot the catch 52 out of the terminal tube section 24, enabling another carrier to be inserted through opening 14-3 and sent. Similarly, if a received carrier has been removed and the door 16 closed without sending a carrier in the interim, a second carrier can be received without transmitting a carrier. Specifically, if a received carrier has been removed and the door closed, the components of the system are in the position shown in FIG. 4. As such, the catch projects into the terminal tube section 24. If a carrier is now received it will momentarily pivot the catch clockwise as it passes upwardly in the direction of arrow 18 to abut the cushion whereupon the blower is terminated, the door opens and the carrier falls back to a position supported atop the catch as shown in FIG. 2.

Thus, a receive and dispatch terminal for a pneumatic carrier has been described which is provided with a mechanical catch in contrast to an electromechanical catch. A completely mechanical catch is unexpensively manufactured, easily maintained and generally lower in cost than electromechanical catches employing solenoids and the like.

The position of the counterweight 54 along rod 56b is selected such that the catch 52 will pivot clockwise, overcoming the counterclockwise bias of spring 65, when the cable 70 is slack and no carrier rests atop the catch. Thus, when the door 16 is open after carrier receipt, slackening the cable 70 and the received carrier removed, the catch 52 automatically moves to its outer retracted position to permit unobstructed insertion of a carrier for transmission, and does so without intervention of electromechanical actuators or the like. The same automatic movement to the retracted position occurs when, without prior receipt and removal of a carrier, the door 16 is moved from a closed to an open condition for carrier transmission. Movement of the catch 52 to its retracted position under the action of the counterweight 54 when the door 16 is closed is prevented by cable 70 which keeps the counterweight 54 in an elevated position. Movement of the catch 52 to its retracted position under the action of the counterweight 54 when the door 16 is open and a carrier supported atop the catch is prevented by the weight of the carrier which applies a counterclockwise moment to the catch of sufficient magnitude to overcome the clockwise moment applied by the counterweight which is not supported by the taut cable 70.

The lost motion mechanism between the catch 52 and the counterweight arm 56 enables a received carrier 10''' to cam the catch 52 outwardly without moving the counterweight 54 in the course of passing from the tube 12 into the terminal tube section 24 for subsequent support by the catch. Movement of the catch 52 to its outer position without movement of the counterweight 54 as an incident to receipt of a carrier is important for two reasons. First, it avoids unnecessarily slowing down the carrier which could conceivably result were a received carrier in the course of moving past the catch 52 to expend some of its kinetic energy of motion in moving the counterweight mass. Second, with the only movement during passage of a carrier past the catch 52 being that of the catch 52, noise, as well as wear and tear on the components of the catch assembly 50, is reduced.

It is possible, although the foregoing advantages are lost, to rigidly interconnect the catch 52 and the counterweight arm 56 and relocate the lost motion connection in the cable 70. With such an arrangement momentary passage of a carrier 10''' past the catch 52 in the direction of arrow 18 would simultaneously move both the catch and the counterweight, with movement of the counterweight rod 56 being possible through the relocated lost motion connection in the cable 70. However, and, as indicated, placement of the lost motion connection between the counterweight and the door drive cable 38, rather than between the detent 52 and the counterweight rod 56, is not recommended due to the increased wear, noise, and deceleration of the moving carrier.

If desired, the door 16, instead of being automatically opened in response to an electrical switch actuated operation of an electric motor, could be opened and closed manually by providing a suitable handle on the door exterior which when gripped would enable the door to be reciprocated vertically. Were such provided, the motor which drives the door actuating cable 38 could be eliminated. However, the cable 38 and associated pulleys 40, 42 and 44 could still be utilized along with cable 70 to hold the counterweight rod 56 in its upper position shown in FIG. 1 when the door is closed and to permit the counterweighted rod to pivot clockwise as viewed in FIG. 1 to retract the detent to its outer position when the door is open and the carrier removed.

Having described the invention, it is claimed:

1. A terminal for sending and receiving carriers pneumatically propelled through a combined system send-/receive tube, comprising:
 a stationary terminal tube section having
  a. a lower open end communicating with said combined send/receive tube,
  b. an upper end, and
  c. a carrier insertion and removal opening intermediate said ends normally closed by a door,
 a carrier catch pivotally mounted for movement between
  a. an inner position projecting into said terminal tube section for supporting the lower end of a received carrier, and
  b. an outer position permitting unobstructed bidirectional passage of a carrier between said combined send/receive tube and said terminal tube section,
 first means interconnected between said catch and door for biasing said catch to said inner position when said door is closed for supporting a received carrier in said terminal tube section while permitting momentary movement of said catch to said outer position during receipt of a carrier in the course of momentary movement thereof past said catch, and second means for biasing said catch to said outer position when said door is open allowing unobstructed insertion of a carrier into said terminal tube section for transmission via said tube, said second means being insufficient to bias said catch to said outer position when said door is open if a carrier is supported by said catch.

2. The apparatus of claim 1 wherein said second bias means is unresponsive to electrical energy to move said catch to its outer position.

3. A terminal for sending and receiving carriers pneumatically propelled through a combined system send/receive tube, comprising:
a stationary terminal tube section having
   a. a lower open end communicating with said combined send/receive tube,
   b. an upper end, and
   c. a carrier insertion and removal opening intermediate said ends normally closed by a door,
a door actuator assembly connected to said door and responsive to arrival and departure of a carrier for selectively opening and closing said door, respectively,
a carrier catch pivotally mounted for movement between
   a. an inner position projecting into said terminal tube section for supporting the lower end of a received carrier, and
   b. an outer position permitting unobstructed bidirectional passage of a carrier between said combined send/receive tube and said terminal tube section,
first means for biasing said catch to said inner position when said door is closed for supporting a received carrier in said terminal tube section while permitting momentary movement of said catch to said outer position during receipt of a carrier in the course of momentary movement thereof past said catch, and second means for biasing said catch to said outer position when said door is open allowing unobstructed insertion of a carrier into said terminal tube section for transmission via said combined send/receive tube, said second bias means being insufficient to bias said catch to said outer position when said door is open if a carrier is supported by said catch.

4. The terminal of claim 3 wherein said bias means includes:
   a. a counterweight connected to said catch to normally apply a bias moment to said catch tending to pivot it to its outer position when said door is in its open and closed positions, and
   b. means connected to said counterweight for inhibiting application of said bias moment by said counterweight to said catch when said door is closed.

5. The terminal of claim 3 wherein said bias means includes:
   a. a counterweight connected to said catch and movable between first and second positions in which said catch is placed in its inner and outer positions, respectively,
   b. lost motion means connected between said catch and counterweight to permit, when said counterweight is in its first position, momentary movement of said catch to said outer position during receipt of a carrier in the course of momentary movement thereof past said catch, and
   c. means connected to said counterweight for holding it in its first position when said door is closed while allowing said counterweight to move to its second position when said door is open and said catch is not supporting a carrier.

6. The terminal of claim 3 wherein said bias means includes:
   a. a counterweight connected to said catch and movable between first and second positions in which said catch is placed in its inner and outer positions, respectively,
   b. lost motion means connected between said catch and counterweight to permit, when said counterweight is in its first position, momentary movement of said catch to said outer position during receipt of a carrier in the course of momentary movement thereof past said catch,
   c. a link between said door and counterweight for holding said counterweight in its first position when said door is closed while allowing said counterweight to move to its second position when said door is open and said catch is not supported by a carrier, and
   d. a spring between said counterweight and catch normally biasing said catch toward its inner position relative to said counterweight.

7. The terminal of claim 6 wherein said door actuator assembly includes:
   a. a bidirectional motor drivingly connected to said door to open and close said door when actuated in first and second directions, respectively, and
   b. switch means responsive to arrival and departure of a carrier relative to said terminal tube section for actuation of said motor in its first and second directions, respectively, to open and close said door, respectively, and in turn to hold said counterweight in its first position when said door is closed and allow it to move to its second position when said door is open if a carrier is not supported by said catch, respectively.

8. The apparatus of claim 3 wherein said second bias means is unresponsive to electrical energy to move said catch to its outer position.

9. A terminal for sending and receiving carriers pneumatically propelled through a combined system send/receive tube, comprising:
a housing having an interior accessible to the environment through an opening normally closed by a door,
a terminal tube section stationarily mounted within said housing having
   a. a lower open end communicating with said combined send/receive tube,
   b. a carrier insertion and removal opening communicating with said housing opening, and
   c. an upper end,
a carrier cushion mounted proximate said upper end of said terminal tube section to limit upward movement of a received carrier,
a door actuator assembly connected to said door and responsive to arrival and departure of a carrier for selectively opening and closing said door, respectively,
a carrier catch pivotally mounted within said housing for movement between (a) an inner position projecting into said terminal tube section for supporting the lower end of a received carrier and (b) an outer position permitting unobstructed bidirectional passage of a carrier between said combined send/ receive tube and said terminal tube section, and
first means for biasing said catch to said inner position when said door is closed for supporting a received carrier in said terminal tube section while permitting momentary movement of said catch to said outer position during receipt of a carrier in the course of momentary movement thereof past said catch, and second means for biasing said catch to said outer position when said door is open allowing unobstructed insertion of a carrier into said terminal tube section for transmission via said combined send/receive tube, said second bias means being insufficient to bias said catch to said outer position when said door is open if a carrier is supported by said catch.

10. The terminal of claim 9 wherein said bias means includes:
   a. a counterweight connected to said catch to normally apply a bias moment to said catch tending to pivot it to its outer position when said door is in its open and closed positions, and
   b. means connected to said counterweight for inhibiting application of said bias moment by said counterweight to said catch when said door is closed.

11. The terminal of claim 9 wherein said bias means includes:
   a. a counterweight connected to said catch and movable between first and second positions in which said catch is placed in its inner and outer positions, respectively,
   b. lost motion means connected between said catch and counterweight to permit, when said counterweight is in its first position, momentary movement of said catch to said outer position during receipt of a carrier in the course of momentary movement thereof past said catch, and
   c. means connected to said counterweight for holding it in its first position when said door is closed while allowing said counterweight to move to its second position when said door is open and said catch is not supporting a carrier.

12. The terminal of claim 9 wherein said bias means includes:
   a. a counterweight connected to said catch and movable between first and second positions in which said catch is placed in its inner and outer positions, respectively,
   b. lost motion means connected between said catch and counterweight to permit, when said counterweight is in its first position, momentary movement of said catch to said outer position during receipt of a carrier in the course of momentary movement thereof past said catch,
   c. a link between said door and counterweight for holding said counterweight in its first position when said door is closed while allowing said counterweight to move to its second position when said door is open and said catch is not supported by a carrier, and
   d. a spring between said counterweight and catch normally biasing said catch toward its inner position relative to said counterweight.

13. The apparatus of claim 9 wherein said second bias means is unresponsive to electrical energy to move said catch to its outer position.

* * * * *

UNITED STATES PATENT OFFICE
CERTIFICATE OF CORRECTION

Patent No. 4,032,082     Dated June 28, 1977

Inventor(s) Adam Weissmuller

It is certified that error appears in the above-identified patent and that said Letters Patent are hereby corrected as shown below:

On the title page, the following should be added:

-- [73] Assignee: The Mosler Safe Company, Hamilton, Ohio --.

Column 5, line 47, "or" should read -- of --.

Signed and Sealed this

Sixth Day of June 1978

[SEAL]

Attest:

RUTH C. MASON
*Attesting Officer*

DONALD W. BANNER
*Commissioner of Patents and Trademarks*